INVENTOR
R. R. BLAIR
BY
V. P. Priolo
ATTORNEY

United States Patent Office 2,754,467
Patented July 10, 1956

2,754,467

APPARATUS FOR TESTING RESISTORS

Royer R. Blair, Berkeley Heights, N. J., assignor to Bell Telephone Laboratories, Incorporated, New York, N. Y., a corporation of New York Application January 28, 1954, Serial No. 406,798

4 Claims. (Cl. 321—19)

This invention relates to apparatus for determining the voltage-current characteristic of resistors and particularly, the voltage-current characteristic of nonlinear resistors.

It is an object of this invention to provide means for indicating and measuring the voltage-current characteristic of a resistor under constant direct voltage conditions.

A feature of the invention resides in the means provided for automatically maintaining the stability of the constant direct voltage applied to the resistor under test.

While this invention may be employed for measuring linear resistors, it is particularly suitable for making measurements on nonlinear resistors.

Electrically, all nonlinear conductive devices, whether they be symmetrically or asymmetrically conductive, have one thing in common. When the voltage applied to the two terminals of such a device is varied, the resulting current does not, in general, vary proportionally with the applied voltage. The voltage-current characteristic of such a device may be determined under constant direct voltage conditions. However, since a small error in voltage can cause a large error in the indicated current, it is important that a high degree of stability be imparted to the applied voltage.

The invention employs an automatic voltage regulation circuit of the type which comprises a series regulator tube and a control amplifier tube. In accordance with a feature of the invention, stability of the voltage applied to the resistor under test is assured by means of a mechanical amplifier in the feedback path which connects the load circuit and the control amplifier.

Figure 1:
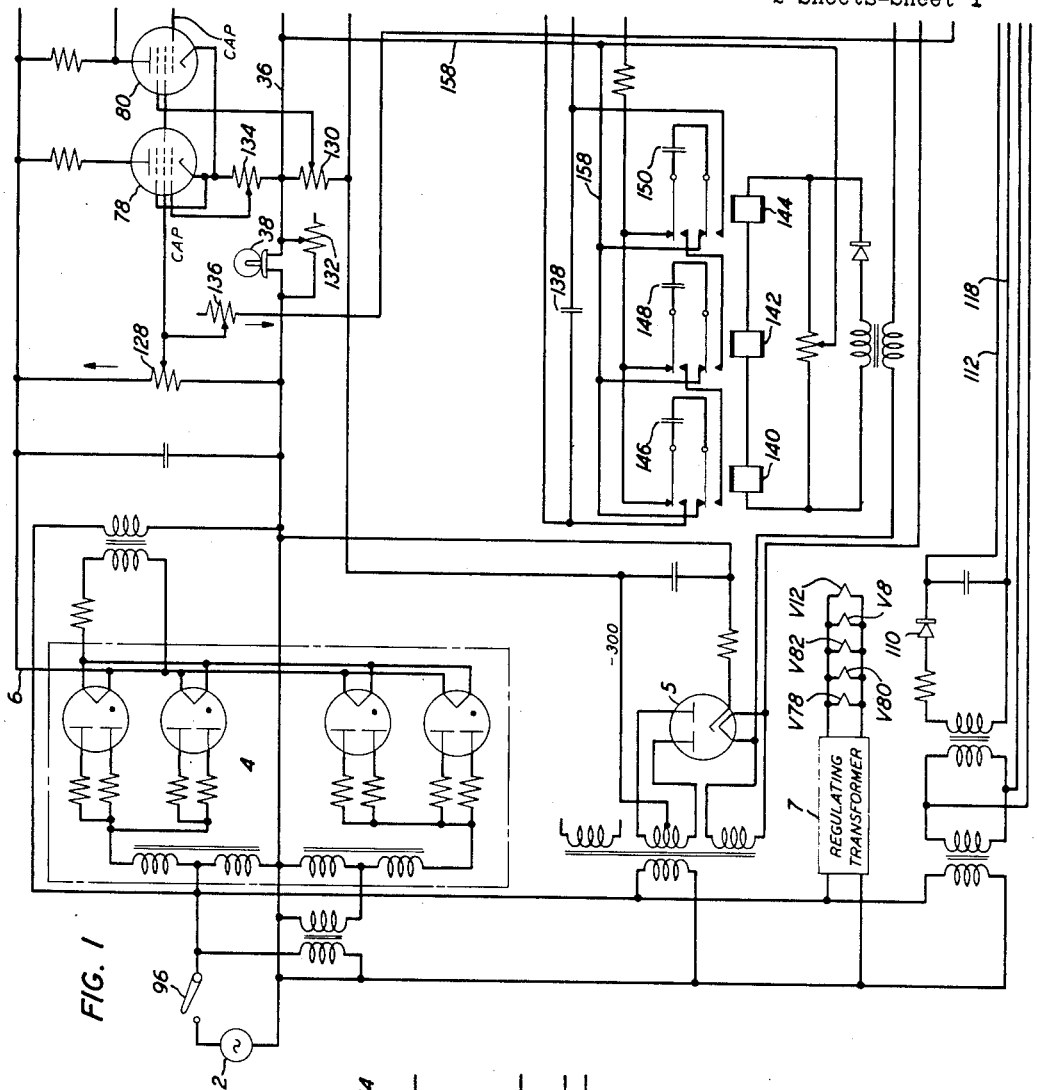
Figure 2:
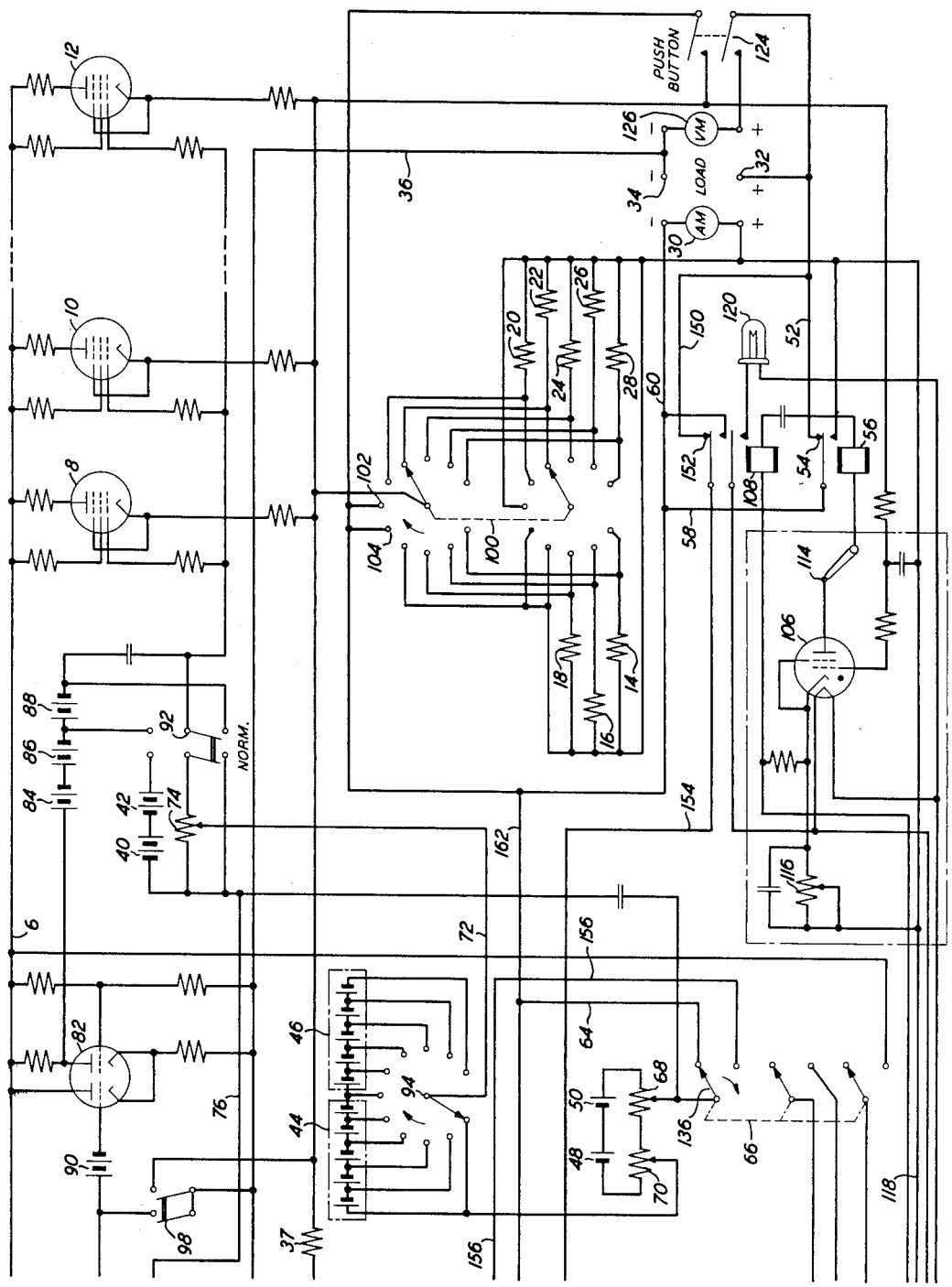

This and other features of the invention will be more clearly understood from the following detailed description and the accompanying drawings in which:

Figs. 1 and 2 show a complete circuit diagram of a preferred embodiment of the invention; and Fig. 3 shows an alternative ammeter protective circuit arrangement.

Referring now to Figs. 1 and 2, the test or load circuit may be traced from the line voltage supply 2, through the main rectifier 4, over conductor 6 to the anodes of series tubes 8, 10 and 12, from the cathodes of the series tubes through one of the resistors 14—28, through the ammeter 30, over conductors 60 and 58, through contact 54 of relay 56, over conductor 52, through load or test terminals 32 and 34, over conductor 36 and through lamp 38 back to the rectifier 4. An auxiliary rectifier 5 is used to draw current through the series tubes 8, 10 and 12 even when the output voltage between terminals 32 and 34 is set at zero, thus eliminating ever having to operate said tubes at complete cut-off. The positive side of this rectifier is connected to the negative side of the main rectifier while the negative side is connected through resistor 37 to the cathode resistors of the series tubes. Current from the series tubes is allowed to flow through resistor 37 to the negative side of the auxiliary rectifier so that the tubes are not completely cut off at zero output voltage. Batteries 40, 42, 44, 46, 48 and 50 are used as voltage references for setting the voltage applied to the test resistor at terminals 32 and 34. These batteries are in the feedback path which may be traced from terminal 32 over conductor 52, through contact 54 of relay 56, over conductors 58, 60, 62 and 64, through switch 66, through resistors 68 and 70, through battery 44, over conductor 72, through resistor 74, and over conductor 76 to the control grid of tube 80. Tubes 80 and 82 constitute a three-stage direct-current amplifier the output of which is fed through bias batteries 84, 86 and 88 and switch 92 to the control grids of series tubes 8, 10 and 12. Battery 90 disposed in the path between the output of tube 80 and the input of tube 82 is also employed as a "C" battery for obtaining proper bias.

All batteries with the exception of batteries 40 and 42, which are included in the feedback path between terminal 32 and the control grid of tube 80 when outputs above 20 volts are required from the test set, operate either into open circuits or at such light loads that they experience practically their full shelf lives. In order to prolong the lives of batteries 40 and 42, switch 92 is maintained in the down or normal position when the batteries are not required in the circuit.

In the embodiment of the invention shown in Figs. 1 and 2, which has been used for testing copper oxide varistors from a small fraction of a volt up to 100 volts and up to currents of one ampere, as many as 12 series tubes have been used to provide the output voltage across terminals 32 and 34.

Potentiometers 68 and 70 provide medium and fine control of small output voltages. Switch 94 increases the output in 1.5 volt steps and potentiometer 74 provides a smooth increase in output up to 90 volts above what is already set on the other controls.

The test set is turned on by means of switch 96, with switch 98 in the closed position. Switch 98 biases the series tubes 8, 10 and 12 to cut-off and short-circuits their output. This prevents excursions of output voltage during warm up. After about 30 seconds switch 98 may be opened.

Switch 100 is set to match the current range of the micro or milliammeter in use. Position 102 or 104 on this switch should be used when changing meters.

With currents about 150 per cent of full scale as indicated by switch 100 sufficient voltage is developed across resistors 14—28 to fire thyratron 106 and operate relays 56 and 108. Relays 56 and 108 are operated by completing the circuit traced from voltage supply 2, through rectifier 110, over conductor 112, through the windings of relays 108 and 56, through switch 114, through thyratron 106, and potentiometer 116, over conductor 118 back to the voltage supply 2. Operation of relay 56 disconnects the load from the test circuit and short-circuits the ammeter. Operation of relay 108 lights the overload light 120 and transfers the input for the mechanical amplifier to be described hereinafter from "+ load" or terminal 32 to "— ammeter." To avoid damaging the ammeter, the short circuit or overload across the load terminals 32 and 34 must be removed before the reset switch 114 is opened to extinguish thyratron 106 and release relays 56 and 108. The ammeter can be damaged if the overload which fired the thyratron is not removed before switch 114 is opened.

In order to provide increased protection for the ammeter the protective circuit arrangement shown in Fig. 3 may be employed. This alternative arrangement is primarily the arrangement shown in Figs. 1 and 2 modified by the addition of another thyratron 122. Thyratron 122 is similar to and connected in parallel with thyratron 106. With the arrangement shown in Fig. 3, switch 114 will always be closed with respect to one of the thyratrons and relay 56 will be kept in its operated or protecting condition by either thyratron 106 or 122 regardless of the position of switch 114 as long as an overload is present. For this application, switch 114 should have a transfer time at least as short as the release time of relay 56.

In each of the ammeter protective arrangements potentiometer 116 controls the percentage of full scale current at which the thyratrons will fire. Due to the large amount of feedback employed around the deamplifier and series tubes, voltage drops in the ammeter and across resistors 14—28 have practically no effect on output voltage. Since the feedback connection to the direct-current amplifier input is from the load itself these voltage drops merely represent a tolerable amount of lost forward gain.

Voltage output may be read by closing switch 124 which connects the voltmeter 126 to the load and also short-circuits both the ammeter 30 and the resistors 14—28. This system prevents the accidental reading of voltmeter current on the ammeter.

Potentiometer 128 is employed to counteract the reduction in plate supply voltage produced by light loads on the test set i. e., up to about 200 milliamperes. It controls screen voltage on tubes 78 and 80, and if a large enough fraction of the reduction in plate voltage is fed to the screens of tubes 78 and 80 it can cause such a rise in the plate potential of tube 80 and hence in the grid potentials of series tubes 8, 10 and 12 that the output voltage measured across terminals 32 and 34 will actually rise with increased load.

The best setting of potentiometer 128 with respect to load will not necessarily give the most constant output voltage for changing power line voltage. A rise in voltage from potentiometer 128 for increasing line voltage will result in a drop in output voltage. However, potentiometer 130, by impressing a fraction of the —300 volt supply on the suppressor of tube 80, tends to provide rising output voltage for increasing line voltage. Hence potentiometers 128 and 130 may be simultaneously adjusted to minimize the effects of both line voltage and moderate load current changes on output voltage.

As larger load currents are drawn the temperature of the filament of lamp 38 rises and its resistance increases in a nonlinear fashion. The drop across it reduces the screen voltage of tube 80, thus tending to increase the plate potential of tube 80 and the output voltage of the test set. This is effective only in the higher current output range where it is needed. By adjusting potentiometer 132, the output voltage may be held quite constant against load current from the point where the effect of potentiometer 128 leaves off up to about 1,200 milliamperes where the output voltage of the set suddenly drops.

Tube 78 is employed to minimize the effect on output voltage of the small changes in heater voltage which are not corrected by the regulator 7. Potentiometer 134 is used to match the characteristics of tubes 78 and 80. Potentiometer 136 is used to change the effective setting of potentiometer 128 when the mechanical amplifier described hereinafter is used.

The effects on circuit performance caused by changes in the screen voltage of tube 78 produced by voltage drops across potentiometers 128 and 132 are incidental and unimportant due to the low value of the common cathode resistor, potentiometer 134.

While the measuring apparatus will normally operate satisfactorily as described, still greater stability, particularly for longer intervals and at very small outputs, may be obtained by including a device which adds as much as 12 decibels of drift-free feedback. On actuating switch 66 so that arm 136 makes contact with conductor 156, condenser 138 is inserted in the previously described feedback path which connects terminal 32 through switch 66 and the reference batteries 40 to 50, to the control grid of tube 80. Also, power is supplied to the double-pole double-throw relays 140, 142 and 144. These relays vibrating at 60 cycles per second charge condensers 146, 148 and 150 which are connected in parallel with the load, and then connect them in series to charge condenser 138 to three times the output voltage. The path followed to charge condensers 146, 148 and 150 may be traced from terminal 32, over conductors 52 and 150, through contact 152 of relay 108, over conductor 154, through condensers 146, 148 and 150, over conductors 158 and 36 to the negative side of rectifier 4. The voltage on condenser 138 is inserted in the feedback path with the proper polarity to reduce the voltage output measured across terminals 32 and 34. With high gain in the direct-current amplifier the output voltage across terminals 32 and 34 ($E_O$) is practically equal to the battery reference voltage ($E_B$) inserted in the feedback path to set the value of $E_O$. Now with the mechanical amplifier in operation and having a gain of X:

$$E_O = E_B - XE_O$$

$$E_O = \frac{E_B}{X+1}$$

and for the preferred embodiment of the invention where $X=3$ $$E_O = \frac{E_B}{4}$$

It is to be understood that the above-described arrangements are illustrative of the application of the principles of the invention. Other arrangements may be devised by those skilled in the art without departing from the spirit and scope of the invention.

What is claimed is:

1. Apparatus for determining the voltage-current characteristic of a resistor under uniform direct-current conditions comprising an automatic voltage regulator circuit of the type having a series regulator tube and a control tube, said control tube having a screen electrode, a suppressor electrode, input and output circuits, a line voltage supply, a main rectifier and an auxiliary rectifier fed from said voltage supply, the positive side of said auxiliary rectifier being connected to the negative side of said main rectifier, a load circuit including a pair of test terminals for said resistor connected in series with said series tube between the positive and negative sides of said main rectifier, means connecting the control tube output circuit to said series tube, means connecting the control tube input circuit across said test terminals, means in said input circuit for establishing the value of the voltage across said test terminals, a first potentiometer connected in shunt with said main rectifier, a second potentiometer connected in shunt with said auxiliary rectifier, a portion of the voltage drop across said first potentiometer being impressed on the screen electrode of said control tube to supplement the compensation provided by said control tube input circuit for changes in voltage across said test terminals caused by changes in load current, a portion of the voltage drop across said second potentiometer being impressed on the suppressor electrode of said control tube to compensate for changes in voltage across said first potentiometer caused by changes in line voltage, said potentiometers being adapted to be adjusted simultaneously to minimize the effects of line voltage and load current changes on the voltage across said test terminals.

2. Apparatus for determining the voltage-current characteristic of a resistor under uniform direct-current conditions comprising an automatic voltage regulator circuit of the type having a series regulator tube and a control amplifier, said amplifier having a control grid, input and output circuits, a load circuit comprising a pair of test terminals for said resistor, a source of direct current connected in series with said regulator tube and said load circuit, means connecting said amplifier output circuit to said regulator tube, means connecting said amplifier input circuit across said test terminals, a condenser in said amplifier input circuit between said test terminals and the control grid of said control amplifier, a group of condensers adapted to be first connected in parallel across said test terminals to be charged to the voltage across said test terminals and then connected in series with the condenser in said amplifier input circuit to charge said condenser, switch means for cyclically connecting said group of condensers in parallel and in series.

3. Apparatus for determining the voltage-current characteristic of a resistor under uniform direct-current conditions comprising an automatic voltage regulator circuit of the type having a series regulator tube and a control amplifier, said amplifier having a control grid, input and output circuits, a load circuit comprising said resistor, a source of direct current connected in series with said regulator tube and said load circuit, means connecting said amplifier output circuit to said regulator tube, means connecting said amplifier input circuit across said resistor, a source of unipotential voltage in said input circuit between said resistor and the control grid of said control amplifier for establishing the value of the voltage across said resistor, a condenser in said input circuit between said resistor and said source of unipotential voltage, a group of condensers adapted to be first connected in parallel across said resistor to be charged to the voltage across said resistor and then connected in series with the condenser in said amplifier input circuit to charge said condenser to a voltage substantially equivalent to the total voltage on said group of condensers, said condenser being connected in said input circuit in such manner as to reduce the voltage across said resistor, switch means for cyclically connecting said group of condensers in parallel and in series.

4. Apparatus for determining the voltage-current characteristic of a resistor under uniform direct-current conditions comprising an automatic voltage regulator circuit of the type having a series regulator tube and a control tube, said control tube having a screen electrode, a suppressor electrode, input and output circuits, a line voltage supply, a main rectifier and an auxiliary rectifier fed from said voltage supply, the positive side of said auxiliary rectifier being connected to the negative side of said main rectifier, a load circuit including said resistor connected in series with said series tube between the positive and negative sides of said main rectifier, means connecting the control tube output circuit to said series tube, means connecting the control tube input circuit across said resistor, a source of unipotential voltage in said input circuit for establishing the value of the voltage across said resistor, a first potentiometer connected in shunt with said main rectifier, a second potentiometer connected in shunt with said auxiliary rectifier, a portion of the voltage drop across said first potentiometer being impressed on the screen electrode of said control tube, a portion of the voltage drop across said second potentiometer being impressed on the suppressor electrode of said control tube, said potentiometers being adapted to be adjusted simultaneously to minimize the effects of line voltage and load current changes on the voltage across said resistor, a condenser in said input circuit between said resistor and said source of unipotential voltage, a group of condensers adapted to be first connected in parallel across said resistor to be charged and then connected in series with the condenser in said input circuit to charge said condenser, switch means for cyclically connecting said group of condensers in parallel and in series.

References Cited in the file of this patent

UNITED STATES PATENTS

| | | |
|---|---|---|
| 2,509,027 | Zimmermann | May 23, 1950 |
| 2,556,129 | Wellons | June 5, 1951 |